(12) United States Patent
Romweber

(10) Patent No.: US 9,528,870 B2
(45) Date of Patent: Dec. 27, 2016

(54) LIQUID REDUCTION TIMING DEVICE

(71) Applicant: Steven H. Romweber, Indianapolis, IN (US)

(72) Inventor: Steven H. Romweber, Indianapolis, IN (US)

( * ) Notice: Subject to any disclaimer, the term of this patent is extended or adjusted under 35 U.S.C. 154(b) by 236 days.

(21) Appl. No.: 14/182,556

(22) Filed: Feb. 18, 2014

(65) Prior Publication Data
US 2014/0230718 A1  Aug. 21, 2014

Related U.S. Application Data

(60) Provisional application No. 61/765,831, filed on Feb. 18, 2013.

(51) Int. Cl.
G01F 23/00 (2006.01)
G01F 23/04 (2006.01)
A47J 36/16 (2006.01)
A47J 41/00 (2006.01)

(52) U.S. Cl.
CPC ............ G01F 23/0007 (2013.01); A47J 36/16 (2013.01); G01F 23/04 (2013.01); A47J 41/0094 (2013.01)

(58) Field of Classification Search
CPC .... G01F 23/0007; A47J 41/0094; G01B 5/061
USPC .................................................. 33/722–731
See application file for complete search history.

(56) References Cited

U.S. PATENT DOCUMENTS

| | | | | |
|---|---|---|---|---|
| 1,742,595 A * | 1/1930 | Hoevel | ............ | G01F 23/04 33/730 |
| 2,098,963 A | 11/1937 | Hexter | | |
| 2,607,122 A * | 8/1952 | Overmyer | ............... | G01F 23/04 33/723 |
| 2,695,453 A * | 11/1954 | Valentine | ............... | G01F 23/04 33/726 |
| 3,067,521 A * | 12/1962 | Platt, II | ............... | B23Q 17/22 33/638 |
| 3,672,061 A * | 6/1972 | Alessi | ............. | G01F 23/04 33/494 |
| 4,675,660 A | 6/1987 | Boscolo | | |
| 5,361,507 A * | 11/1994 | Lopez | ............... | A61B 5/1072 33/512 |
| 5,566,465 A * | 10/1996 | Zoellner | ............... | G01F 23/04 33/572 |
| 6,467,183 B2 * | 10/2002 | Larsen | ............. | G01B 3/20 33/679.1 |
| 7,263,893 B2 * | 9/2007 | Kosmyna | ............. | B01F 13/002 73/726 |
| 8,061,198 B2 | 11/2011 | Yinko et al. | | |

FOREIGN PATENT DOCUMENTS

DE   102005055610 A1 * 12/2006 ............. G01F 23/04
GB   2285509            7/1995

OTHER PUBLICATIONS

English translation of DE 102005055610 A1.*

* cited by examiner

*Primary Examiner* — Laura Martin
*Assistant Examiner* — Irving A Campbell
(74) *Attorney, Agent, or Firm* — Daniel L. Boots; Brian W. Chellgren; Bingham Greenebaum Doll LLP

(57) ABSTRACT

Disclosed herein is a liquid reduction timing device useful for cooking. More specifically, the disclosed liquid reduction timing device indicates to a user that a liquid has been reduced to a predetermined level when the level of the liquid is equal to the station of a movable indicator.

19 Claims, 11 Drawing Sheets

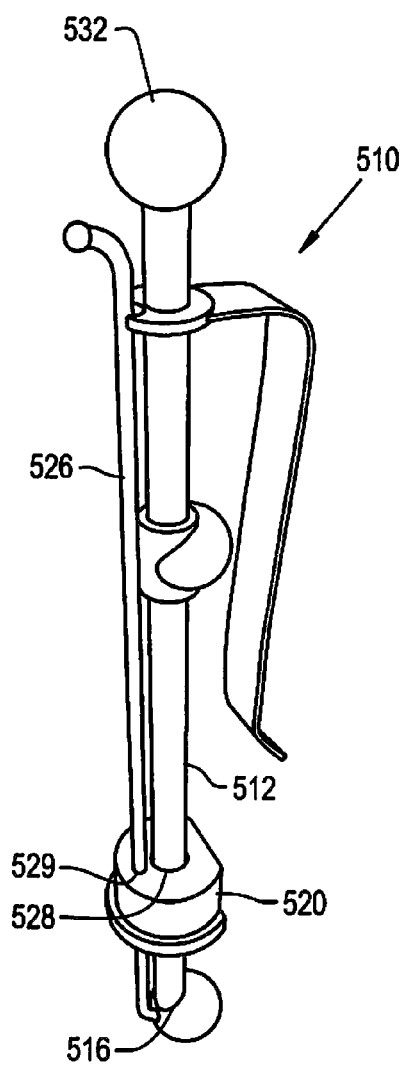
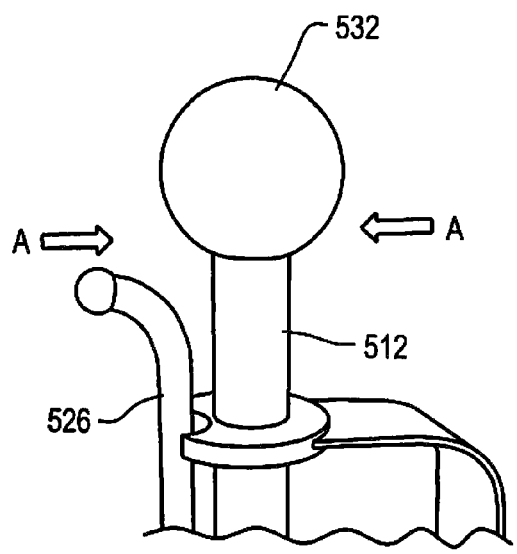
Fig. 6A
Fig. 6B

LIQUID REDUCTION TIMING DEVICE

CROSS-REFERENCE TO RELATED APPLICATION

This application claims the benefit of priority to U.S. Provisional Patent Application Ser. No. 61/765,831, filed Feb. 18, 2013, entitled LIQUID REDUCTION TIMING DEVICE, incorporated herein by reference.

FIELD OF THE INVENTION

This disclosure relates to liquid reduction timing devices useful for cooking. More specifically, the disclosed liquid reduction timing device of this invention indicates to a user that a liquid has been reduced to a predetermined level when the level of the liquid is equal to the longitudinal station of an indicator.

BACKGROUND OF THE INVENTION

"Reduction" is a cooking technique wherein a liquid is reduced in volume by boiling. Reduction is often used to thicken or intensify the flavor of a liquid mixture, such as a soup, sauce, syrup, wine, or juice. Reduction is often performed by boiling a liquid in a container without a lid or cover, thereby allowing vapor to escape and the volume of liquid to decrease to a desired level.

A cook may reduce a liquid using guesswork, simply by observing a boiling liquid in a container and reducing the applied heat when he or she estimates that the liquid has been reduced by the proper amount. A need exists for a device capable of indicating to a cook in a more precise and quantifiable manner that a liquid has indeed been reduced to the preferred predetermined level.

SUMMARY OF THE INVENTION

The disclosed liquid reduction timing device provided by this invention comprises an elongated body, a clip attached to the body, and an indicator slidably attached to the body. The indicator is slidably positioned by the user to a desired station on the body, namely, a station equal to the desired liquid level at the end of the reduction process. The liquid reduction timing device is adapted to be removably attachable to a cooking container used for boiling liquid, such as, for example, a pot, kettle, or cauldron, by attaching the device to the side wall of the container using the clip, such that at least a portion of the body is disposed within the container. The user then reduces the liquid within the container by applying heat and boiling the liquid. Reduction of the liquid level within the container to the station of the indicator indicates to the user that the desired level of reduction has occurred and the reduction process can then be terminated.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions. Further, some of the figures shown herein may have been created from scaled drawings or from photographs that are scalable. It is understood that such dimensions, or the relative scaling within a figure, are by way of example, and not to be construed as limiting.

FIG. 6A is a perspective view of a sixth embodiment of a liquid reduction timing device provided by this invention. FIG. 6B is an expanded view of the means for retaining the indicator of this sixth embodiment show in FIG. 6A.

DESCRIPTION OF THE PREFERRED EMBODIMENT

Figure 1A:
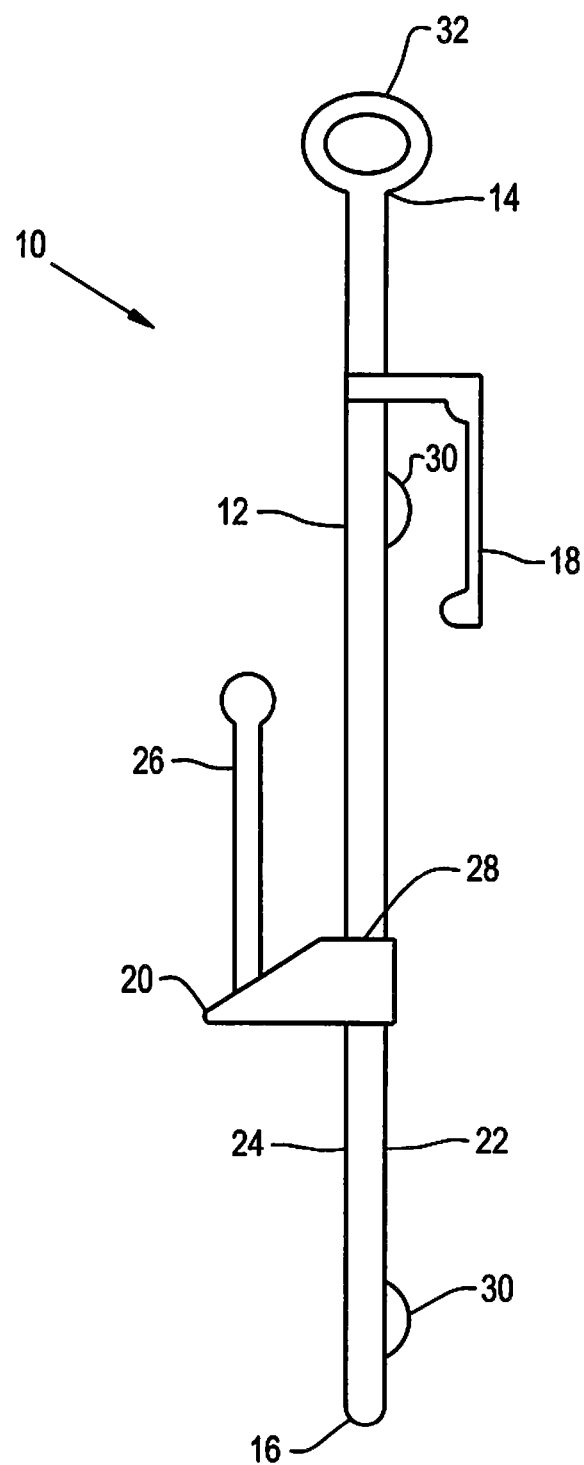
FIG. 1A is a side view of a first embodiment of a liquid reduction timing device provided by this invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims.

The use of an N-series prefix for an element number (NXX) refers to an element that is the same as the non-prefixed element (XX), except as shown and described thereafter. The usage of words indicating preference, such as "preferably," refers to features and aspects that are present in at least one embodiment, but which are optional for some embodiments. As an example, an element 426 would be the same as element 26, except for those different features of element 426 shown and described. Further, common elements and common features of related elements are drawn in the same manner in different figures, and/or use the same symbology in different figures. As such, it is not necessary to describe the features of 426 and 26 that are the same, since these common features are apparent to a person of ordinary skill in the related field of technology.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

Figure 1B:
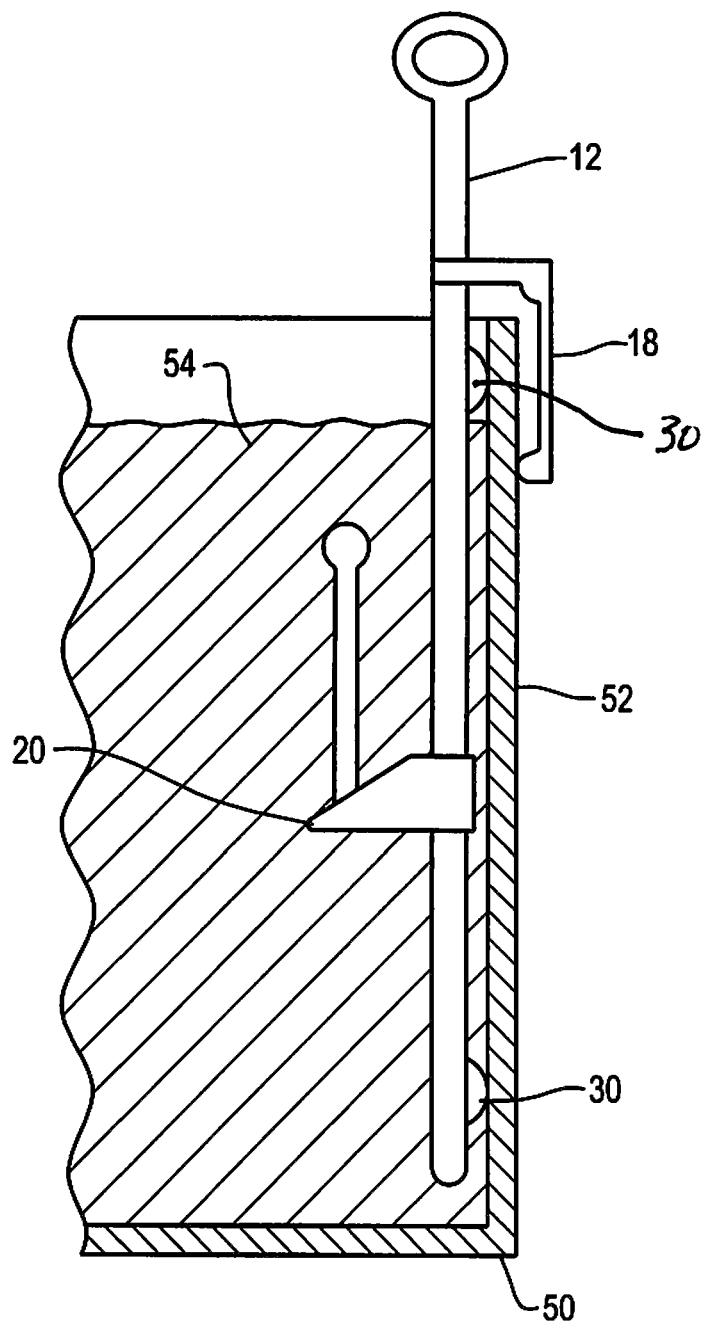
FIG. 1B is a side view of the first embodiment positioned in a container, shown in cross-section, partially filled with liquid.
Figure 1C:
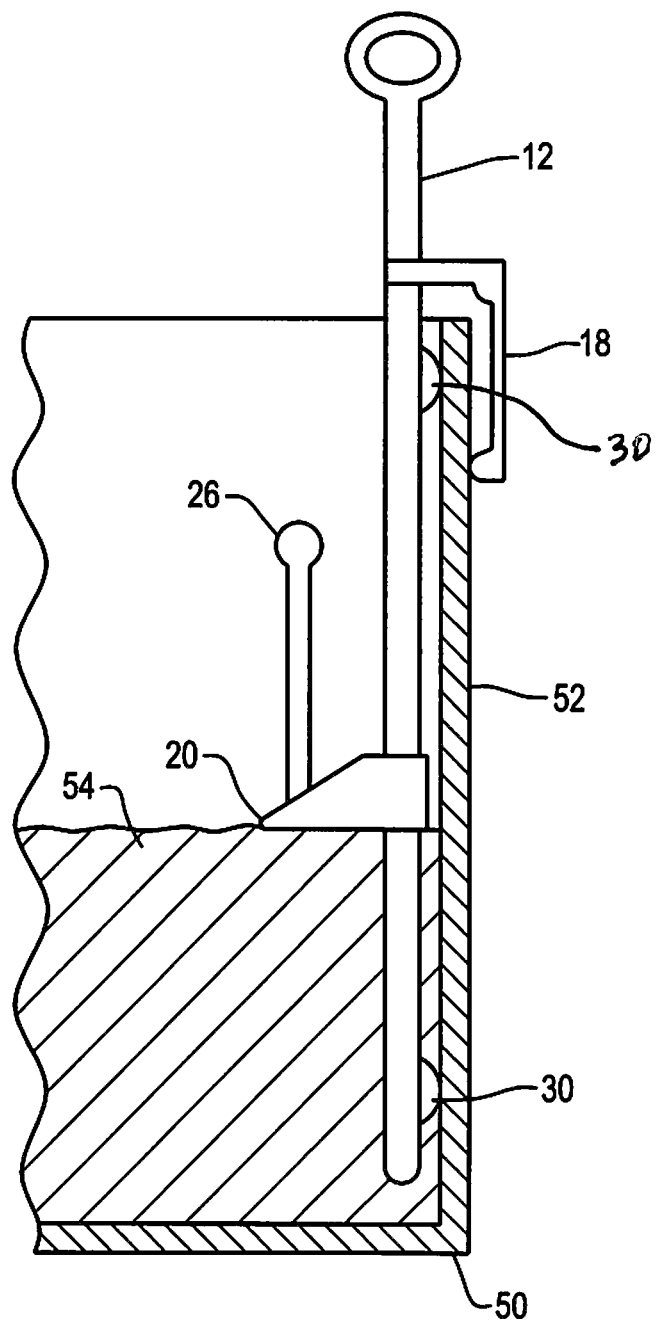
FIG. 1C is a side view of the first embodiment positioned in the container, shown in cross-section, after reduction of a portion of the liquid.
Figure 2:
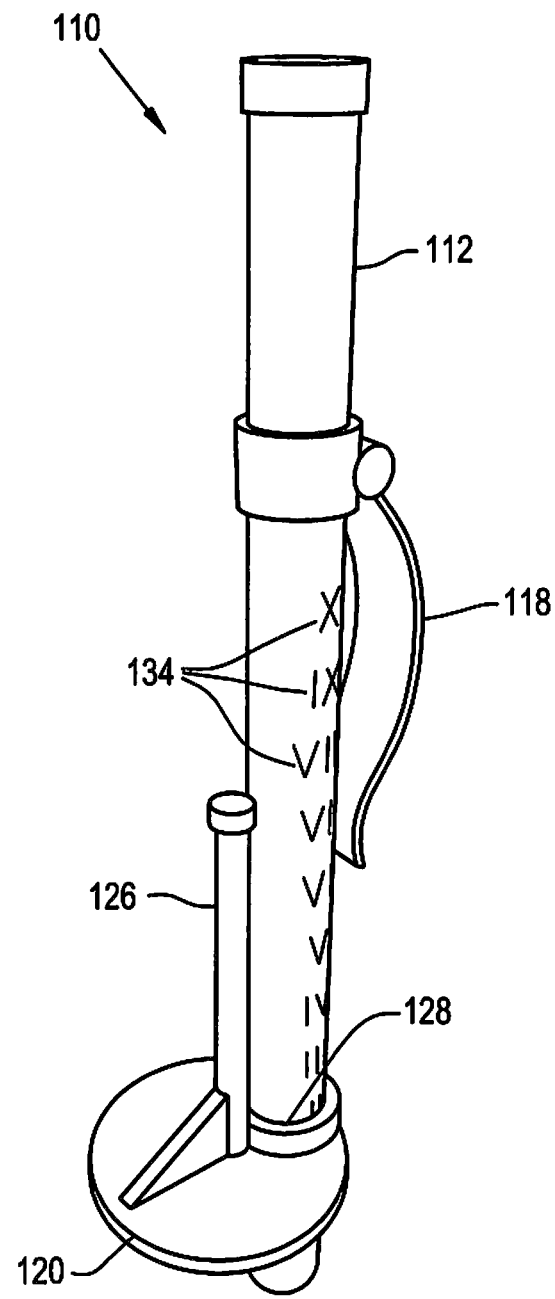
FIG. 2 is a perspective view of a second embodiment of a liquid reduction timing device provided by this invention.
Figure 3:
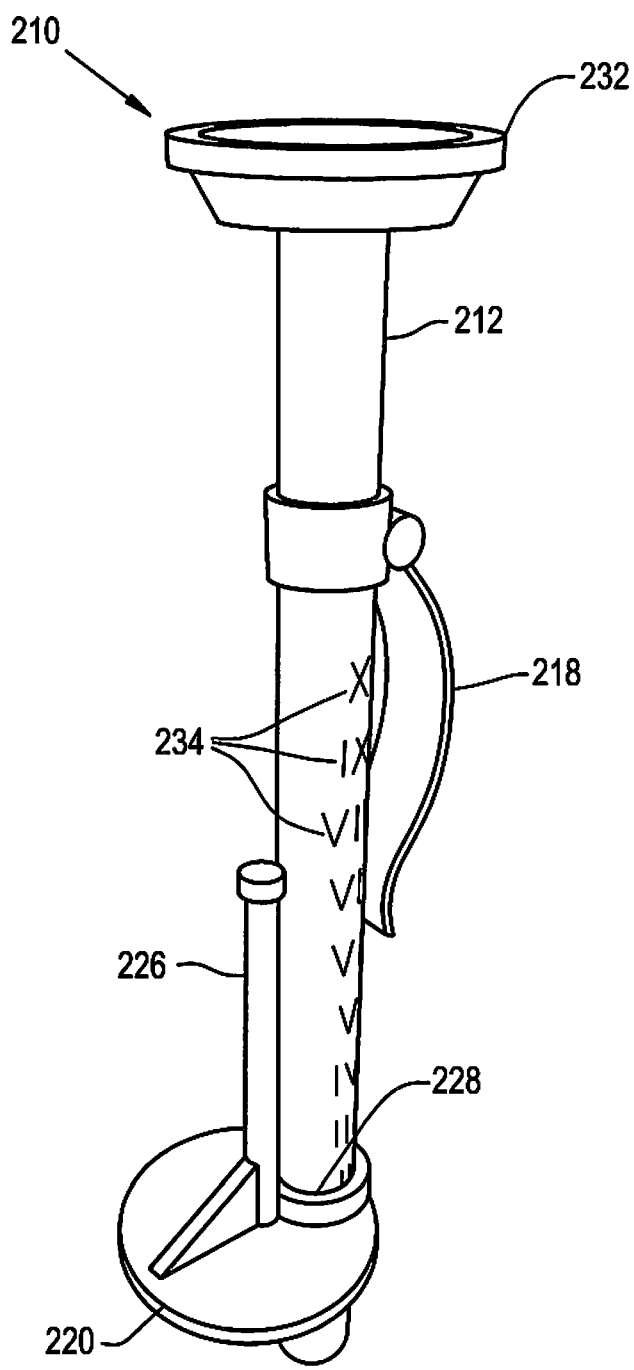
FIG. 3 is a perspective view of a third embodiment of a liquid reduction timing device provided by this invention.
Figure 4:
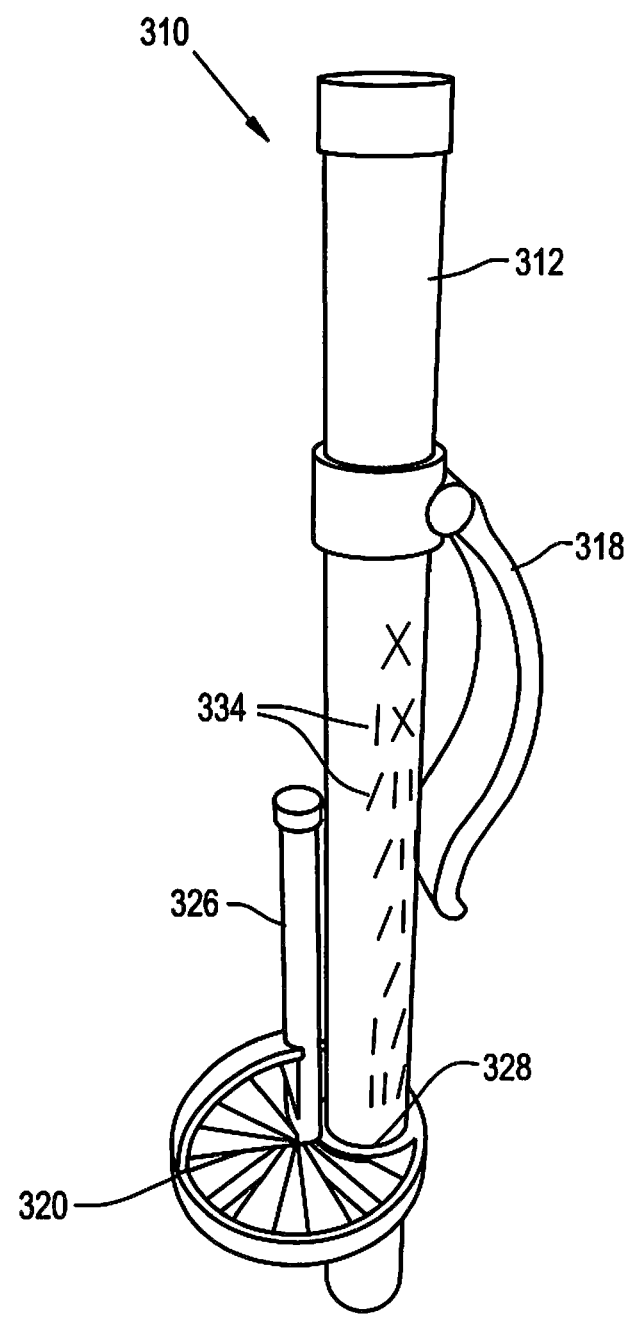
FIG. 4 is a perspective view of a fourth embodiment of a liquid reduction timing device provided by this invention.
Figure 5:
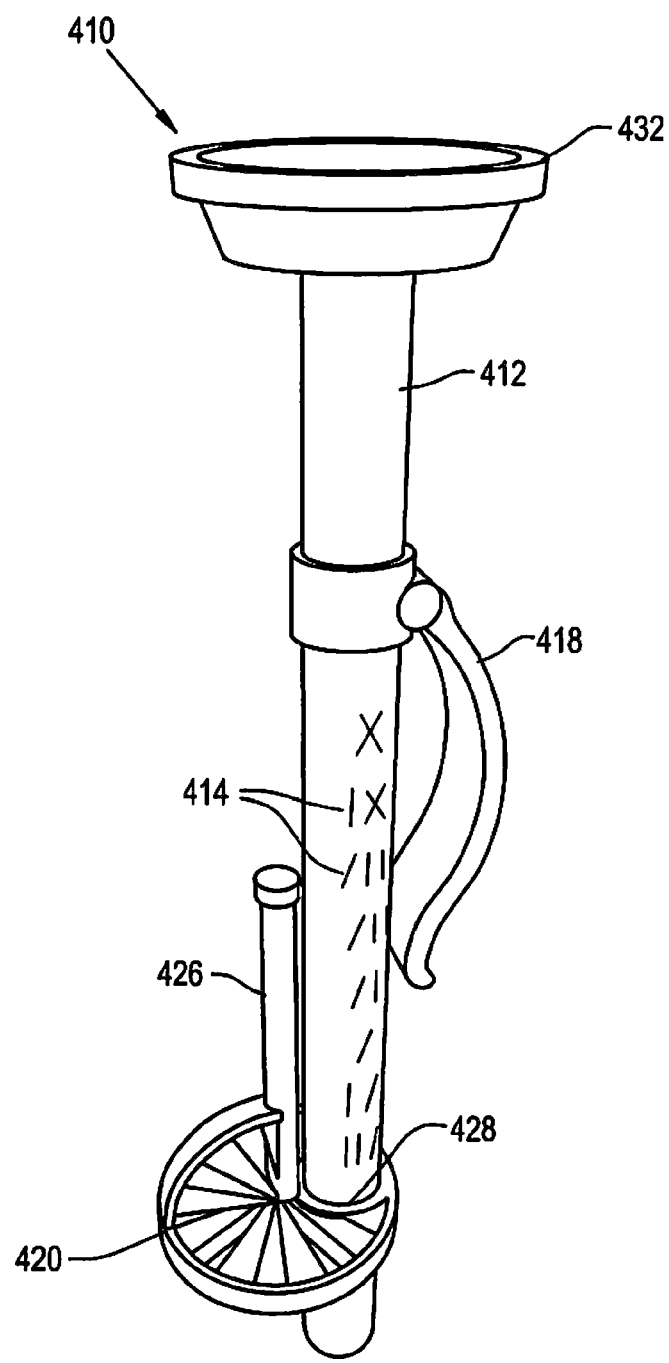
FIG. 5 is a perspective view of a fifth embodiment of a liquid reduction timing device provided by this invention.

Referring now to FIGS. 1A-C, one preferred disclosed liquid reduction timing device 10 of this invention comprises an elongated body 12 having a top 14, a bottom 16 opposite the top 14, and at least one side. A securing member 18 for removably attaching the device 10 to a cooking container 50 is attached to the body 12 and extends from a first side 22 of the body 12. In some embodiments, the securing member 18 is a clip slidably attached to the body 12, such that it can be positioned at different stations along the height of the body 12. In other embodiments, the clip 18 is fixed to a specific station on the body 12. An indicator 20 is slidably attached to the body 12 such that it can be positioned at different stations along the height of the body 12. The indicator 20 extends from a second side of body 24. In the embodiment shown in FIGS. 1A-C, the first and second sides 22, 24 are preferably defined by opposite sides of the body 12. In the depicted embodiment, the body 12 is preferably a rod about 12 inches in height and about ⅜ths of an inch in diameter. In some embodiments, the device 10 includes a handle 32 extending from the top 14 of the body. In some embodiments, the bottom 16 of the body is formed of or covered by a material adapted to not scratch, abrade, or otherwise damage the interior of container 50.

The device 10 includes a control rod 26 used to control the positioning of the indicator 20. In the embodiment shown in FIGS. 1A-C, the control rod 26 is affixed to the indicator 20 and extends generally upwardly therefrom. In some embodiments, the indicator 20 includes an indicator bore 28 through which the body 12 extends. The indicator bore 28 snugly fits the body 12 and maintains the position of the indicator 20 on the body 12 by a friction fit. The user may slidably re-position the indicator 20 along the body 12 by pulling or pushing the control rod 26 or indicator 20 upward or downward to overcome the friction fit.

FIGS. 1B and C show the liquid reduction timing device 10 attached to a container 50, namely, a cooking pot, containing a liquid 54 both before (FIG. 1B) and after (FIG. 1C) reduction. The clip 18 removably attaches the device to the side wall 52 of the container 50, such that the body 12 is generally disposed in an upright, vertical orientation substantially parallel to the side wall 52 of the container 50 and with at least a portion of the body 12 arranged within the container 50. A portion of the side wall 52 is secured between the clip 18 and the body 12 by a friction fit, maintaining the device 10 in position. The indicator 20 is set by the user at a station along the body 12 equal to the desired post-reduction liquid level. The user then reduces the liquid 54 within the container by applying heat and boiling the liquid 54. Reduction of the level of the liquid 54 level within the container 50 to the station of the indicator 20 as shown in FIG. 1C indicates to the user that the desired level of reduction has occurred and the reduction process can then be terminated.

In some embodiments, the device 10 further comprises at least one spacer 30 extending from the first side of the body. In this first embodiment, the device 10 includes two spacers 30. In this embodiment, the spacers 30 are heat-resistant beads or the like affixed to the first side 22 of the body 12. The heat-resistant beads are configured to withstand the temperature of boiling water, boiling oil, or other liquids used in cooking at their respective boiling points without degradation. As shown in FIGS. 1B and C, the spacers 30 are configured to interpose between the body 12 and the side wall 52, preventing the body from directly contacting the container 50 and maintaining the body 12 in an orientation substantially parallel to the side wall 52.

FIGS. 2-5 depict second, third, fourth and fifth embodiments, respectively, of a liquid reduction timing device 110, 210, 310, 410, comprising an elongated body 112, 212, 312, 412, a clip 118, 218, 318, 418, and an indicator 120, 220, 320, 420. The second (FIG. 2) and third (FIG. 3) embodiments are identical, apart from the third embodiment including a flange-shaped handle 232 arranged atop body 212. The fourth (FIG. 4) and fifth (FIG. 5) embodiments are likewise identical, apart from the fifth embodiment including a flange-shaped handle 432 arranged atop body 412. Similar to the first embodiment, each of the second, third, fourth and fifth embodiments includes an indicator 120, 220, 320, 420, having an indicator bore 128, 228, 328, 428, through which the body 112, 212, 312, 412, extends. The bore 128, 228, 328, 428 snugly fits the body 112, 212, 312, 412 and maintains the position of the indicator 120, 220, 320, 420 on the body 112, 212, 312, 412 by a friction fit. The user may slidably re-position the indicator 120, 220, 320, 420 along the body 112, 212, 312, 412 by simply pulling or pushing the control rod 126, 226, 326, 426 or indicator 120, 220, 320, 420 upward or downward to overcome the friction fit. While these embodiments as shown lack spacers, the invention contemplates such embodiments alternatively including spacers.

In certain embodiments, as shown in FIGS. 2-5 for example, the body includes markings 134, 234, 334, 434, such as numbers or letters to indicate different vertical positions on the body. For example, in embodiments where the clip is fixed to the body, the body may include markings designating of distance from the clip (for example, ¼", ½, ¾", or 1 cm, 2 cm, 3 cm) to aid the user in positioning the indicator. In the embodiments depicted in FIGS. 2-5, the markings 134, 234, 334, 434 are a sequential series of roman numerals (I, II, III, IV, . . . ) extending vertically along the body 112, 212, 312, 412.

FIGS. 6A-B depict a sixth embodiment of a liquid reduction timing device 510 of this invention. This sixth embodiment includes a substantially spherical handle 532 arranged atop body 512. In this embodiment, the indicator 520 includes at least one indicator bore. The body 512 extends through a first indicator bore 528 and slidably engages the indicator 520. The control rod 526 is attached at or in proximity to the bottom 516 of the body 512 and extends upwardly through a second indicator bore 529. The control rod 526 is biased in a position that is not parallel to the direction of the second indicator bore 529, such that a friction fit between the control rod 526 and the indicator 520 maintains the position of the indicator 520. The user may adjust the orientation of the control rod 526 to place the control rod 526 substantially parallel to the direction of the second bore 529 to relieve the friction fit between the control rod 526 and indicator 520, thereby allowing the indicator 520 to be slid upwardly and downwardly along the body 512 and control rod 526 to a desired station. The user may squeeze the control rod 526 and body together 512, as indicated by arrows A-A in FIG. 6B, to place the control rod 526 substantially parallel to the direction of the second bore 529.

Figure 7:
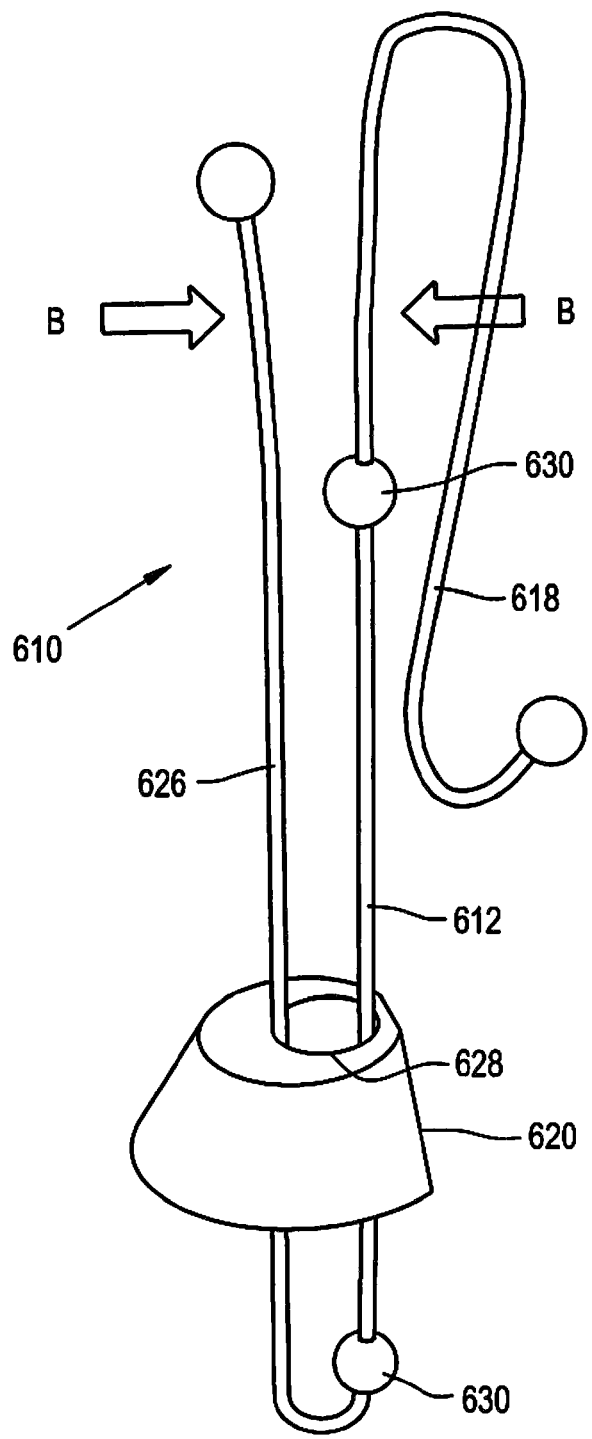
FIG. 7 is a perspective view of a seventh embodiment of a liquid reduction timing device provided by this invention.

FIG. 7 depicts a seventh embodiment of a liquid reduction timing device 610 provided by this invention. In this embodiment, the clip 618, body 612, and control rod 626 are formed from a single piece. Both the body 612 and control rod 626 extend through a single indicator bore 628. The body 612 and control rod 626 are biased in a spaced-apart orientation, such that friction between the body 612 and indicator 620 and between the control rod 626 and the indicator 620 maintains the position of the indicator 620. The user may adjust the orientation of at least one of the control rod 626 and the body 612 to relieve the friction fit and allow the indicator 620 to be freely slid upwardly and downwardly. For example, the user may squeeze the control rod 626 and body 612 together, as indicated by arrows B-B in FIG. 7, thereby relieving the friction against the indicator 620 and allowing the indicator 620 to be re-positioned. In this embodiment, the handle 632 is formed by an upward curve between the body 612 and clip 618 portions of the device. In this embodiment, the spacers 630 are preferably substantially spherical beads through which the body 612 extends.

In this seventh embodiment, the spacers 630 are configured to serve at least two (2) separate functions. First, the spacers 630 are configured to interpose between the body 612 and the side wall of a container (not shown), preventing the body 612 from contacting the container. Second, the spacers 630 also have a diameter of sufficient size to prevent the indicator bore 628 from passing the body 612, a spacer 630, and the control rod 626, thereby preventing the indicator 620 from sliding off the liquid reduction timing device 610.

Figure 8A:
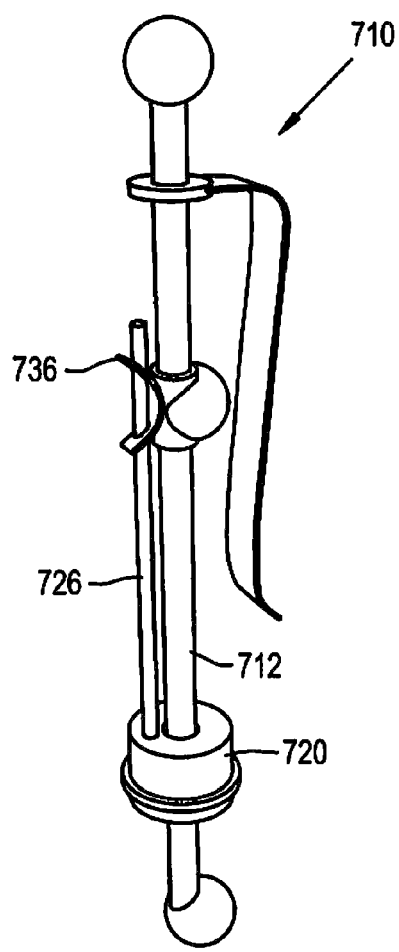
FIG. 8A is a perspective view of an eighth embodiment of a liquid reduction timing device provided by this invention.
Figure 8B:
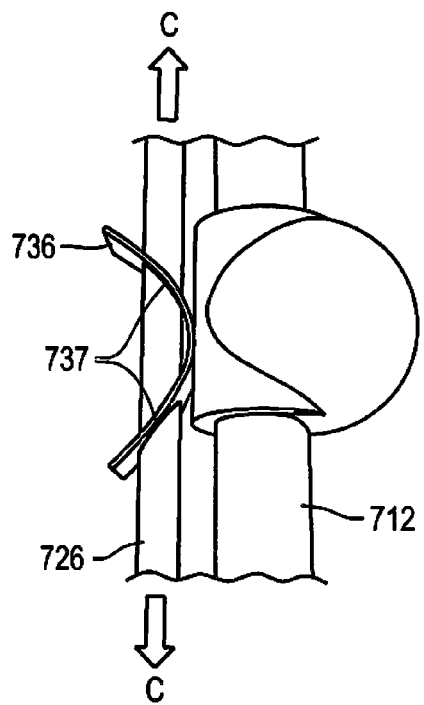
FIG. 8B is an expanded view of the means for retaining the indicator of this eighth embodiment shown in FIG. 8A.

Referring now to FIGS. 8A-B, the depicted eighth embodiment of a liquid reduction timing device 710 illustrates an additional means for maintaining the indicator at a specific station on the body 712. In this embodiment, the control rod 726 is affixed to the indicator 720 and extends upwards from the indicator 720 substantial parallel to the body 612. The indicator 720 includes a single indicator bore 728 through which the body 712 extends.

In this embodiment, a retaining member 736 is fixed to and extends from the body 712, and the control rod 726 extends through apertures 737 in the retaining member 736. The retaining member 736 is configured such that the control rod 726 contacts the sides of the apertures 737. Friction between the retaining member 736 and the control rod 726 maintains the position of the control rod 726 and indicator 720 with respect to the body 712. By squeezing the retaining member 736, the apertures 737 are repositioned in alignment with the control rod 726, such that the control rod 726, and the indicator 720 affixed thereto, may be freely moved upwardly or downwardly along the body 712, as indicated by arrows C-C in FIG. 8B, to a desired station. When the user releases the retaining member 736, it returns to its original configuration and friction between the retaining member 736 and the control rod 726 maintains the control rod 726 and indicator 720 at the desired station.

Figure 9:
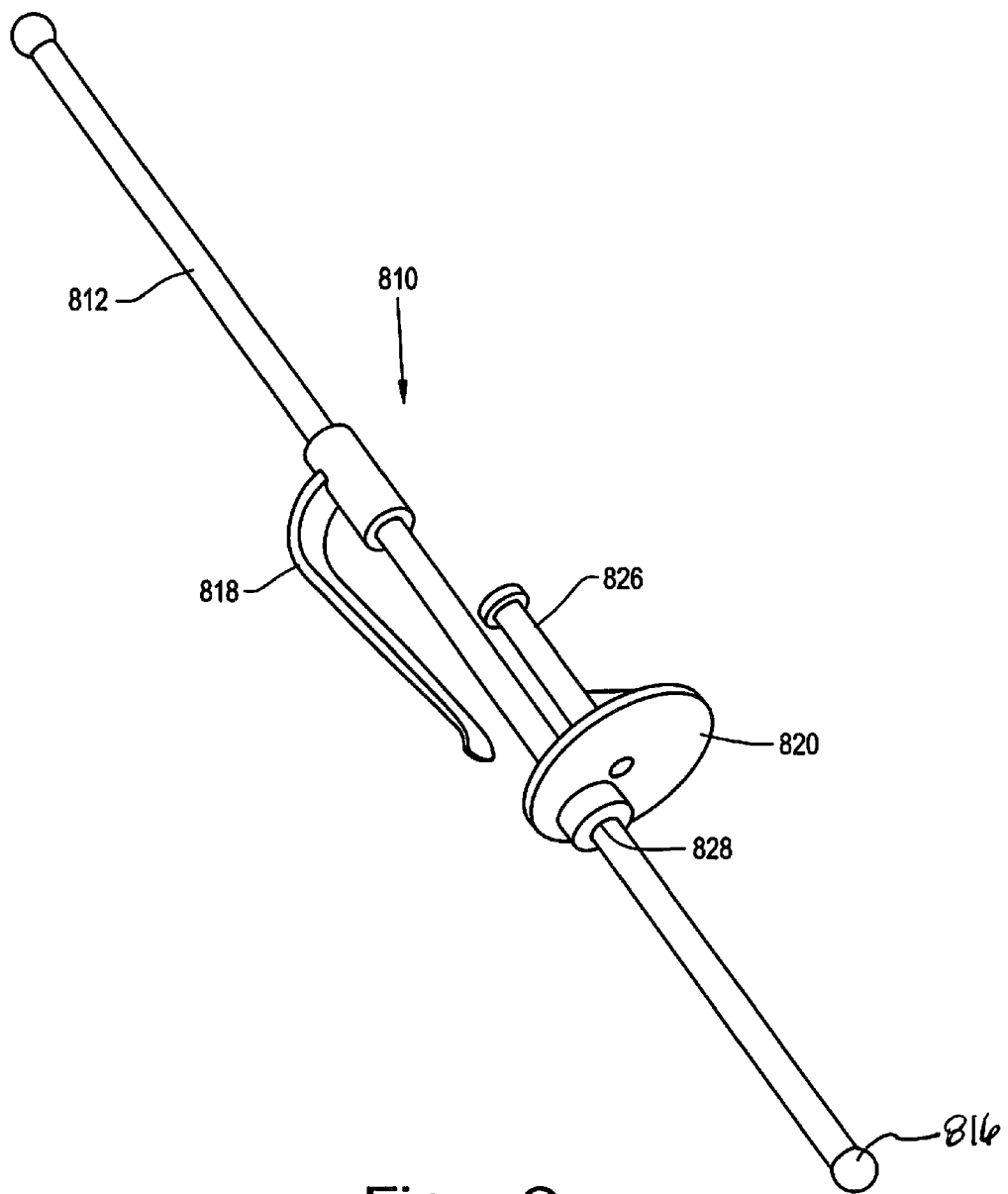
FIG. 9 is a perspective view of a ninth embodiment of a liquid reduction timing device provided by this invention.

FIG. 9 depicts a ninth embodiment of a liquid reduction timing device 810. This ninth embodiment is generally similar in structure to the first embodiment, but lacks spacers 30. The bottom 816 of the body 812 is covered by a cap to prevent the body 812 from scratching or abrading the bottom of a container when the device 810 is in use. The cap is preferably formed a resilient material capable of withstanding exposure to boiling water or boiling cooking oil without impairment.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

I claim:

1. A device for use in cooking, comprising:
    an elongated body including a top, at least one side, and a bottom opposite the top;
    a securing member attached to the body, the securing member extending from the body in a first direction; and
    an indicator slidably attached to the body, the indicator extending from the body in a second direction,
    wherein the securing member is configured to removably secure the body to a cooking container such that at least a portion of the body is disposed within the container, and
    wherein the indicator includes at least one indicator bore, and wherein the body extends through the at least one indicator bore.

2. The device of claim 1, wherein the securing member is a clip.

3. The device of claim 1, wherein the securing member is configured to removably secure a portion of the cooking container between the securing member and the body.

4. The device of claim 1, wherein the securing member is configured to removably secure the body to a cooking container such that the indicator is disposed within the container.

5. The device of claim 1, wherein the securing member is slidably attached to the body.

6. The device of claim 1, further comprising a control rod affixed to the indicator.

7. The device of claim 6, wherein the control rod extends substantially parallel to the body.

8. The device of claim 1, further comprising a control rod affixed to the body.

9. The device of claim 8, wherein the body and the control rod both extend through the at least one indicator bore.

10. The device of claim 9, wherein the at least one indicator bore includes a first indicator bore and a second indicator bore, wherein the body extends through the first indicator bore and the control rod extends through the second indicator bore.

11. The device of claim 10, wherein the first indicator bore and the second indicator bore are substantially parallel to each other.

12. The device of claim 10, wherein the control rod is biased with respect to the second indicator bore.

13. The device of claim 8, wherein the control rod and the body are formed of a single piece.

14. The device of claim 13, wherein the control rod, the body, and the securing member are formed of a single piece.

15. The device of claim 1, wherein the first direction and second direction are opposite directions.

16. The device of claim 1, further comprising at least one spacer extending from the body in the first direction.

17. The device of claim 16, wherein the at least one spacer is at least one heat-resistant bead.

18. The device of claim 1, further comprising a handle.

19. The device of claim 1, wherein a handle is attached to the top of the body.

* * * * *